(12) United States Patent
Marvin

(10) Patent No.: US 7,728,450 B2
(45) Date of Patent: Jun. 1, 2010

(54) GENERATOR OUTPUT CIRCUITRY FOR TWIN TURBINE WIND POWER GENERATING SYSTEM

(75) Inventor: Russel Hugh Marvin, Goshen, CT (US)

(73) Assignee: Optiwind Corp, Torrington, CT (US)

( * ) Notice: Subject to any disclaimer, the term of this patent is extended or adjusted under 35 U.S.C. 154(b) by 0 days.

(21) Appl. No.: 11/903,453

(22) Filed: Sep. 21, 2007

(65) Prior Publication Data

US 2008/0315586 A1 Dec. 25, 2008

(51) Int. Cl.
*F03D 9/00* (2006.01)
*H02P 9/04* (2006.01)
(52) U.S. Cl. .......................................... 290/44; 290/55
(58) Field of Classification Search ................... 290/44, 290/55
See application file for complete search history.

(56) References Cited

U.S. PATENT DOCUMENTS

| | | | | | |
|---|---|---|---|---|---|
| 4,110,631 | A | * | 8/1978 | Salter | 290/55 |
| 4,159,427 | A | * | 6/1979 | Wiedemann | 290/55 |
| 4,174,923 | A | * | 11/1979 | Williamson | 415/211.1 |
| 4,245,182 | A | * | 1/1981 | Aotsu et al. | 322/20 |
| 4,320,304 | A | * | 3/1982 | Karlsson et al. | 290/55 |
| 4,340,822 | A | * | 7/1982 | Gregg | 290/55 |
| 5,083,039 | A | * | 1/1992 | Richardson et al. | 290/44 |
| 5,146,096 | A | * | 9/1992 | McConachy | 290/44 |
| 5,225,712 | A | * | 7/1993 | Erdman | 290/44 |
| 5,289,041 | A | * | 2/1994 | Holley | 290/44 |
| 5,526,252 | A | * | 6/1996 | Erdman | 363/41 |
| 5,581,470 | A | * | 12/1996 | Pawloski | 702/61 |
| 5,876,181 | A | * | 3/1999 | Shin | 415/2.1 |
| 6,100,600 | A | * | 8/2000 | Pflanz | 290/54 |
| 6,204,642 | B1 | * | 3/2001 | Lawson et al. | 322/20 |
| 6,294,844 | B1 | * | 9/2001 | Lagerwey | 290/55 |
| 6,294,898 | B2 | * | 9/2001 | Lawson et al. | 322/20 |
| 6,492,801 | B1 | * | 12/2002 | Sims et al. | 324/142 |
| 6,850,426 | B2 | * | 2/2005 | Kojori et al. | 363/123 |
| 6,924,628 | B2 | * | 8/2005 | Thompson | 322/20 |
| 7,042,110 | B2 | * | 5/2006 | Mikhail et al. | 290/44 |
| 7,075,189 | B2 | * | 7/2006 | Heronemus et al. | 290/44 |
| 7,086,835 | B2 | * | 8/2006 | Yoshida | 416/9 |
| 7,190,149 | B2 | * | 3/2007 | Huff et al. | 322/20 |
| 7,244,100 | B2 | * | 7/2007 | Yoshida | 416/9 |
| 7,288,921 | B2 | * | 10/2007 | Huff et al. | 322/20 |
| 7,385,300 | B2 | * | 6/2008 | Huff et al. | 290/40 F |
| 7,518,258 | B1 | * | 4/2009 | Marvin | 290/44 |
| 7,525,211 | B2 | * | 4/2009 | Marvin | 290/44 |
| 2002/0198648 | A1 | * | 12/2002 | Gilbreth et al. | 701/100 |
| 2003/0168864 | A1 | * | 9/2003 | Heronemus et al. | 290/55 |
| 2004/0164717 | A1 | * | 8/2004 | Thompson | 322/21 |
| 2004/0245783 | A1 | * | 12/2004 | Gilbreth et al. | 290/52 |
| 2005/0012339 | A1 | * | 1/2005 | Mikhail et al. | 290/44 |
| 2005/0017514 | A1 | * | 1/2005 | Tocher | 290/55 |
| 2005/0042093 | A1 | * | 2/2005 | Yoshida | 416/41 |
| 2005/0093373 | A1 | * | 5/2005 | Chapman et al. | 307/80 |
| 2005/0162018 | A1 | * | 7/2005 | Realmuto et al. | 307/44 |

(Continued)

*Primary Examiner*—T C Patel
*Assistant Examiner*—Pedro J Cuevas
(74) *Attorney, Agent, or Firm*—Ted Paulding

(57) ABSTRACT

Improved generator output circuitry for twin turbine includes boost DC converters for each of a pair of generators with their output introduced to a single inverter, which serves both generators and converters in common. The inverter output then proceeds in conventional AC form through a disconnect switch to a power grid.

15 Claims, 5 Drawing Sheets

U.S. PATENT DOCUMENTS

| | | | |
|---|---|---|---|
| 2005/0169755 A1* | 8/2005 | Yoshida | 416/132 B |
| 2005/0285574 A1* | 12/2005 | Huff et al. | 322/24 |
| 2005/0286179 A1* | 12/2005 | Huff et al. | 361/20 |
| 2006/0067825 A1* | 3/2006 | Kilaras | 416/179 |
| 2006/0092588 A1* | 5/2006 | Realmuto et al. | 361/62 |
| 2006/0138782 A1* | 6/2006 | Friesth | 290/55 |
| 2007/0024247 A1* | 2/2007 | Ichinose et al. | 322/24 |
| 2007/0138021 A1* | 6/2007 | Nicholson | 205/628 |
| 2007/0162189 A1* | 7/2007 | Huff et al. | 700/287 |
| 2007/0246943 A1* | 10/2007 | Chang et al. | 290/44 |
| 2008/0023964 A1* | 1/2008 | Sureshan | 290/55 |
| 2008/0061559 A1* | 3/2008 | Hirshberg | 290/55 |
| 2008/0093861 A1* | 4/2008 | Friesth et al. | 290/55 |
| 2008/0124217 A1* | 5/2008 | Friesth | 416/132 B |
| 2008/0211234 A1* | 9/2008 | Grassi | 290/55 |
| 2008/0315585 A1* | 12/2008 | Marvin | 290/44 |
| 2009/0079194 A1* | 3/2009 | Marvin | 290/44 |
| 2009/0167026 A1* | 7/2009 | Marvin | 290/55 |
| 2009/0238676 A1* | 9/2009 | Marvin | 415/4.3 |

* cited by examiner

GENERATOR OUTPUT CIRCUITRY FOR TWIN TURBINE WIND POWER GENERATING SYSTEM

BACKGROUND OF THE INVENTION

Twin wind turbines mounted on a common rotatable support for rotation about horizontal axes are shown in the following U.S. Patents, disclosures incorporated herein by reference;

| U.S. Pat. No. | Pub. date | Inventor | Class/Sub. |
|---|---|---|---|
| 4,021,140 | May 3, 1977 | Weisbrich | 416/117 |
| 4,156,579 | May 29, 1979 | Weisbrich | 415/2.1 |
| 4,288,199 | Sep. 8, 1981 | Weisbrich | 415/232 |
| 4,332,518 | Jun. 1, 1982 | Weisbrich | 415/232 |
| 4,540,333 | Sep. 10, 1985 | Weisbrich | 415/4.3 |

Reference is also had to U.S. patent application Ser. No. 11/820,741, entitled IMPROVED CONTROL SYSTEM FOR TWIN TURBINE WIND POWER GENERATING SYSTEM, filed Jun. 19, 2007, invented by Russel H. Marvin, hereby incorporated herein by reference.

A control system for operating the twin turbines of the present invention is disclosed in the foregoing patent application but a most efficient means of providing AC power output is lacking. More specifically, individual converters and inverters for each wind driven AC generator are employed in a somewhat complex and expensive system.

It is the general object of the present invention to provide a twin wind turbine system of the type mentioned with a means for providing an AC power output which is simple in design, which may be constructed at economic advantage, and which is yet highly efficient and durable in operation.

SUMMARY OF THE INVENTION

In fulfillment of the foregoing object and in accordance with the present invention a DC converter is provided for each of the twin turbine AC generator systems and receives the output of its respective AC generator driven by a wind turbine. Sensing means monitors at least one parameter such as power, speed, voltage or current output of one generator and a controller is provided to receive signals from the sensing means. The controller includes a reference in the form of a predetermined desired performance curve for the generator and is connected with the boost converter and operates to adjust the generator output in accordance with the desired performance curve. Further, the controller operates to adjust generator output to adjust the thrust of the turbine associated therewith and thus adjusts the angular position of the support associated with the turbines.

More particularly, the adjustment of the output of the said one generator is accomplished by adjusting the PWM duty cycle of the boost converter associated with the said one turbine.

Preferably, the controller employs current and voltage or speed signals from the sensing means to calculate actual power and compare the same with the predetermined performance curve. When an AC generator is employed as in the present instance, frequency may of course be sensed as the speed signal. Upper and lower power limits may also be established.

Further, the generator is preferably of the permanent magnet three-phase type with at least one phase sensed.

In addition to the foregoing control parameters, it is advantageous to have a position sensor for the turbine support means, which advises the controller of the instantaneous angular position of the support. Meteorological data including wind speed and direction is also desirable and is supplied to the computer from appropriate instrumentation on a stationary portion of a tower, which carries the supports for the wind turbines.

In accordance with an important aspect of the present invention, the output of the DC boost converters is directed to a common inverter for conversion back to an AC voltage for delivery to a grid.

Finally, it should be noted that the supports for the turbines are configured to split and accelerate a stream of wind as it approaches the turbines and may therefore be properly referred to as accelerators as well as supports.

DESCRIPTION OF PREFERRED EMBODIMENT

Figure 1:
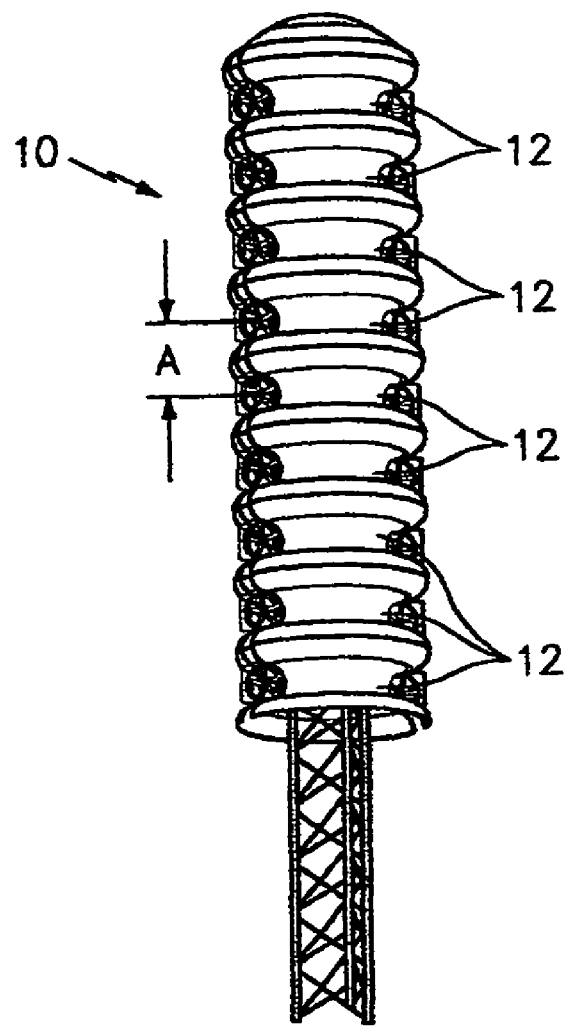
FIG. 1 is a schematic view of a tower carrying a vertical series of supports or accelerators each in turn carrying a pair of wind turbines spaced apart horizontally and each rotatable about a horizontal axis, the axes being in parallel relationship.

Referring particularly to FIG. 1, a tower indicated generally at 10 carries ten (10) horizontally rotatable accelerators 12, 12.

Figure 2:
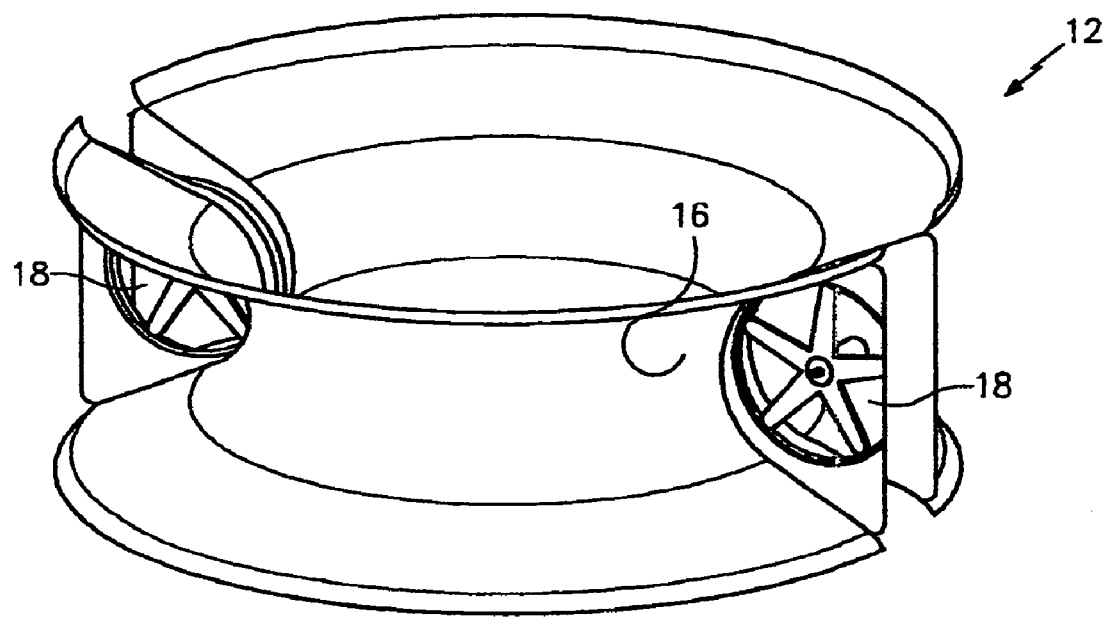
FIG. 2 is an enlarged view of a single support or accelerator and a pair of wind turbines mounted thereon.
Figure 3:
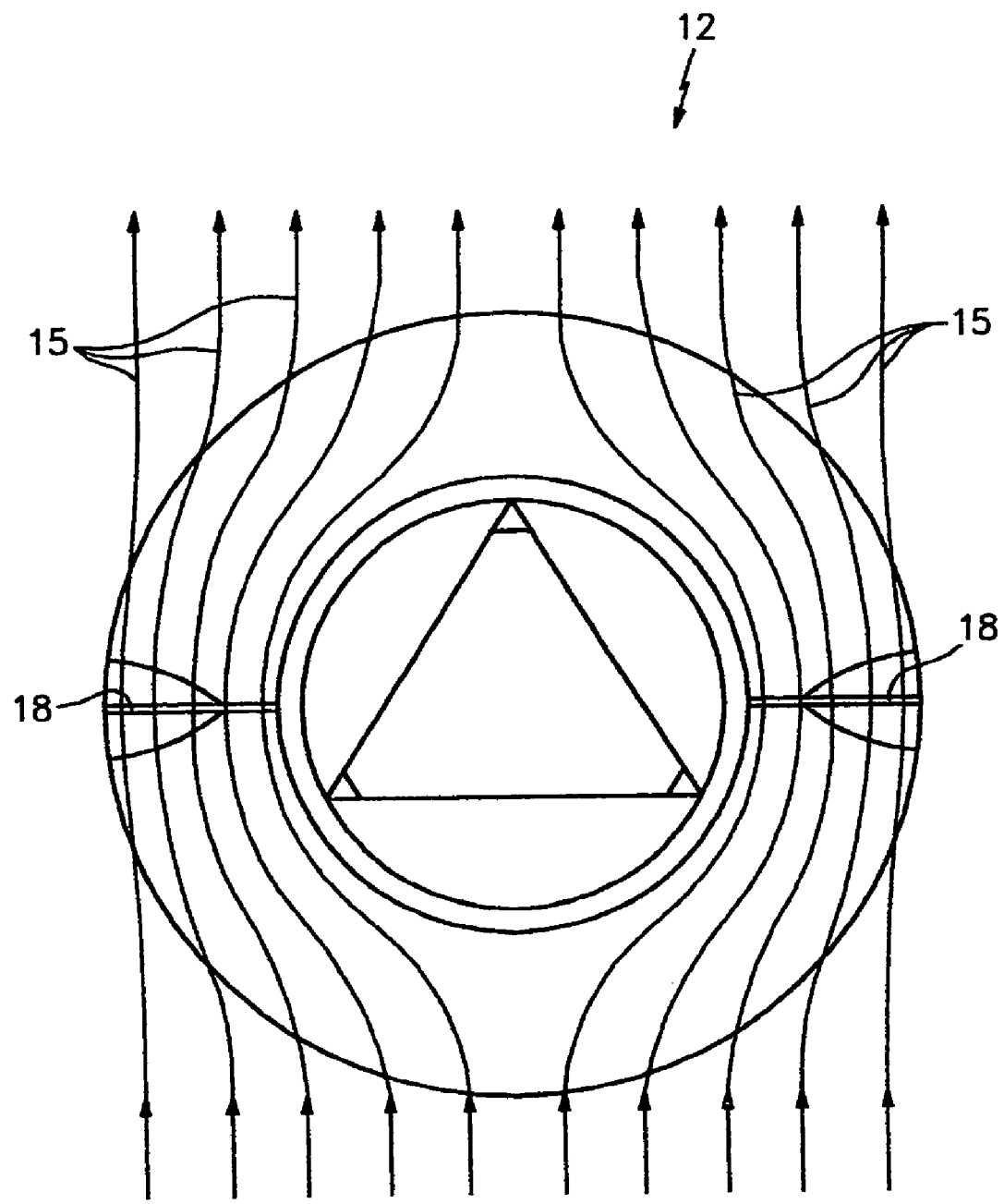
FIG. 3 is an enlarged horizontal cross sectional view through a support or accelerator showing wind flow therethrough.

As best illustrated in FIG. 2, each accelerator 12 takes a generally circular configuration with an annular recess 16, approximately semi-circular in cross section, opening radially outwardly and extending throughout its circumference. Twin turbines 18, 18 are mounted on horizontal shafts and spaced apart one hundred and eighty degrees to receive bifurcated wind generated air streams as best illustrated in FIG. 3. As will be apparent, each stream of air is accelerated as it proceeds from the front of the accelerator rearwardly and outwardly about the arcuate surface of the recess 16.

Figure 4A:
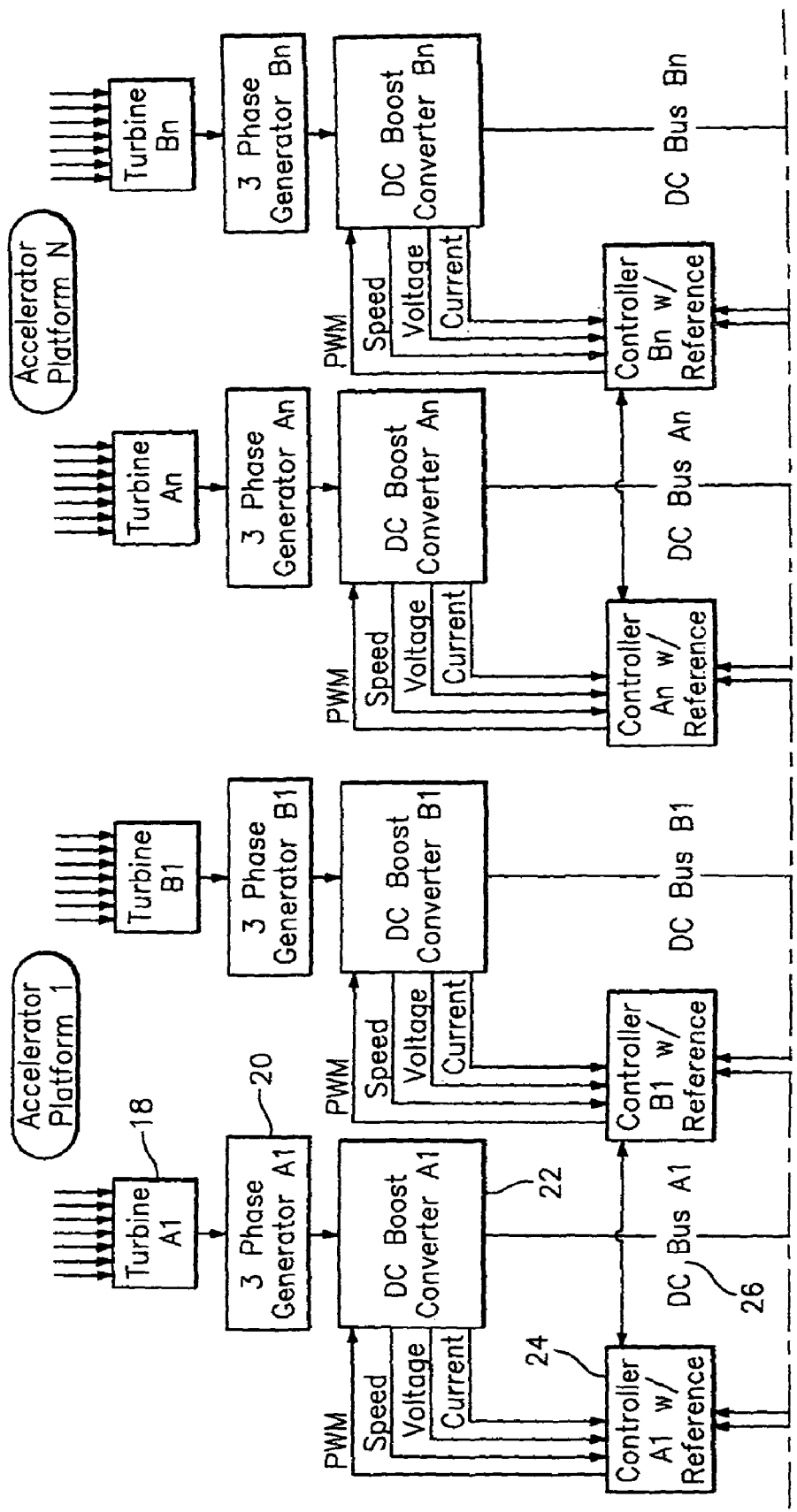
FIGS. 4A and B form a block diagram illustrating twin turbines and their associated generators and an improved AC output system.
Figure 4B:
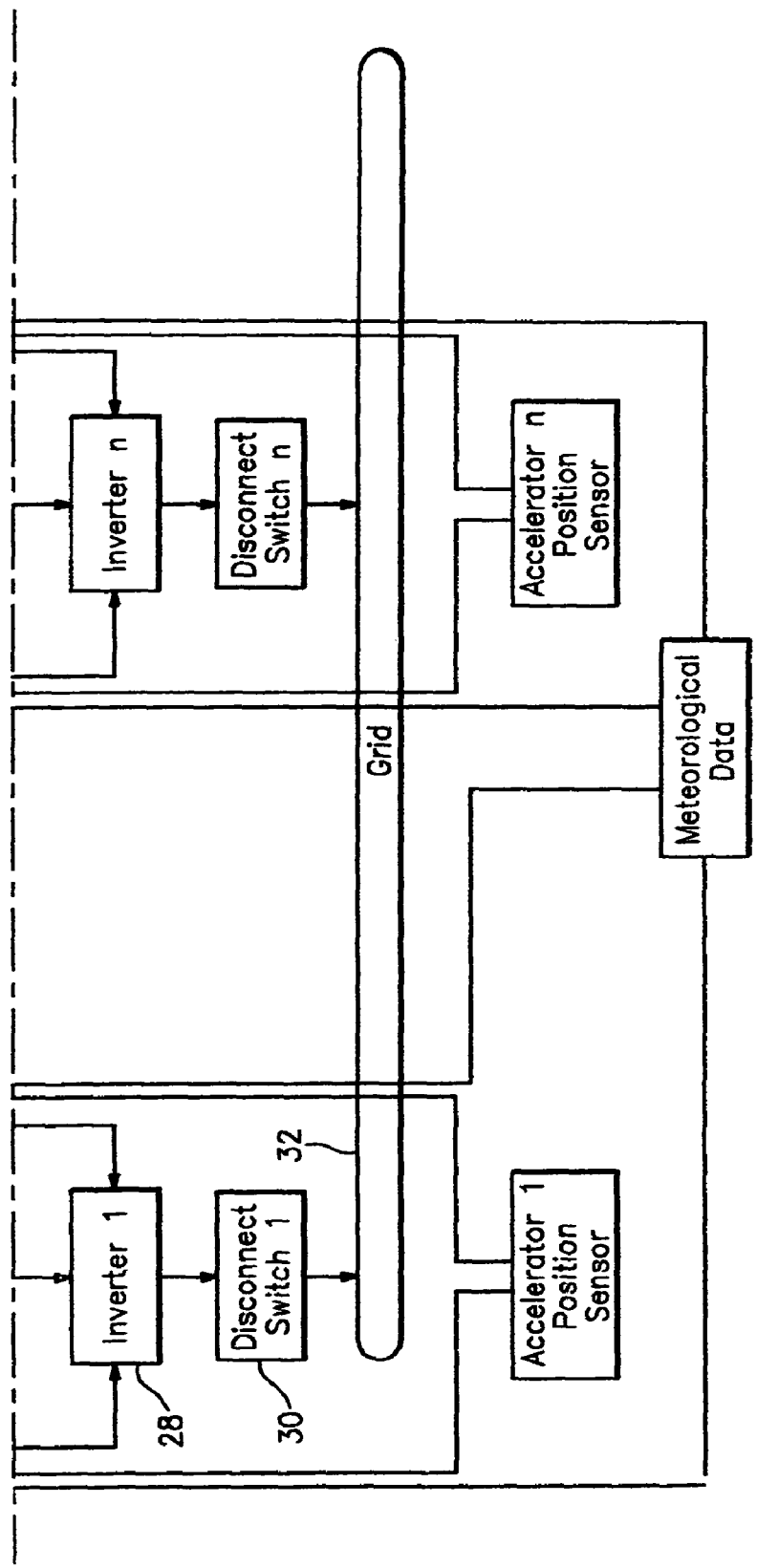

Referring now to FIG. 4, it will be obvious that all four turbine generator control systems are or may be identical with A1 and B1 representing turbines in common on a first accelerator and An and Bn representing turbines mounted in common on other accelerators. The A1 system will be described as representative.

Turbine 18 drives AC generator 20 which may be conventional and of a variety of different constructions but which is preferably of the three-phase permanent magnet type.

DC boost converter 22 may be conventional with variable pulse width capability and has at least one parameter sensing means and preferably speed, voltage and current sensing means associated therewith and connected with the controller 24. Controller 24, is preferably a conventional micro processor type, receives signals from the sensing means, calculates power therefrom, and compares with a reference in the form of a desired performance curve. The computer 24 then adjusts the PWM duty cycle to adjust generator output as required to bring the output into compliance with the desired curve. Further, the computer serves to adjust the generator output to adjust the thrust of its associated turbine and thereby adjust the angular position of the accelerator to maintain an optimum angle of attack for the wind relative to the turbine blades. This is accomplished by adjusting the relative thrust until the accelerator stops rotating.

From the boost converter 22 generator output proceeds conventionally through DC bus 26, inverter 28 which serves both the generator 20 and a second generator 20a in the system B1, and thence in conventional AC form through disconnect switch 30 to grid 32.

From the foregoing it will be apparent that a desirably simple AC-DC-AC conversion system has been provided for ease and convenience in manufacture and for efficient operation over a long service life.

The invention claimed is:

1. A wind power generating system comprising at least two wind turbines mounted in common on a horizontally rotatable support in spaced relationship with each other on opposite sides of the axis of the support for rotation about horizontal axes, each turbine being connected in driving relationship with an electrical generator, which is in turn connected to an external load; at least two DC converters and power switches respectively receiving the output of said generators, at least two sensing means monitoring at least one parameter of operation of one generator, a controller connected with and receiving signals from said sensing means and including a reference in the form of a performance curve for said generators, wherein said controller is connected in controlling relationship with each of said generators such that at least one generator follows the performance curve and the other generator adjusts the thrust of its turbine and thereby adjusts the angular position of the horizontally rotatable support.

2. A wind powered generating system as set forth in claim 1 wherein a DC boost converter is provided with variable pulse width capability, and wherein said adjustment of generator output is made by adjusting the PWM duty cycle of said boost converter.

3. A wind powered generating system as set forth in claim 1 wherein the controller employs both current and voltage signals from the sensing means.

4. A wind powered generating system as set forth in claim 1 wherein the generators are of the three phase type, and wherein the current and voltage of at least one phase are both sensed.

5. A wind powered generating system as set forth in claim 1 wherein the controller calculates the power output from the speed and current outputs of said one generator.

6. A wind powered generating system as set forth in claim 1 wherein a support position sensor is included and advises the controller of the angular position of the support.

7. A wind turbine generating system as set forth in claim 6 wherein an upper power limit is established by the controller, the latter serving to adjust the angular position of the support as required to reduce power when said limit is exceeded.

8. A wind turbine generating system as set forth in claim 6 wherein a lower power limit is established by the controller, the latter serving to adjust the angular position of the support as required to increase power when said limit is exceeded.

9. A wind turbine generator as set forth in claim 8 wherein meteorological data gathering devices are mounted on a stationary tower section and connected with said controller.

10. A wind turbine generating system as set forth in claim 9 wherein the data includes wind speed.

11. A wind turbine generating system as set forth in claim 9 wherein the data includes wind direction.

12. A wind turbine generating system as set forth in claim 1 wherein the horizontal support is configured to separate the wind into two distinct air streams and accelerate each air stream before it enters its respective turbine.

13. A wind turbine generating system as set forth in claim 12 wherein the controller causes one generator to adjust the thrust of its turbine until the horizontal support stops moving.

14. A wind turbine generating system as set forth in claim 2 wherein the PWM of the converters is selected by comparing a function of voltage and current between the two generators.

15. In a wind power generating system comprising at least two wind turbines mounted in common on a horizontally rotatable support in spaced relationship with each other on opposite sides of the axis of the support for rotation about horizontal axes, each turbine being connected in driving relationship with an electrical generator in turn connected with an external load; an improved control system comprising two DC boost converters with variable pulse width capability respectively receiving the output of said two generators, sensing means monitoring at least one of the power, speed, voltage, and current outputs of at least one generator, a controller connected with and receiving signals from said sensing means and including a reference in the form of a desired performance curve for said generator, the controller also being connected in controlling relationship with said generator through its boost converter and operating to adjust the pulse width to control the generator output, whereby at least one generator is operated by said controller to adjust generator output and thereby adjust thrust of the turbine associated therewith and the angular position of the rotatable support, and a single inverter means receiving the out put of said at least two DC converters and providing an aggregate AC output.

* * * * *